Figure 4A:
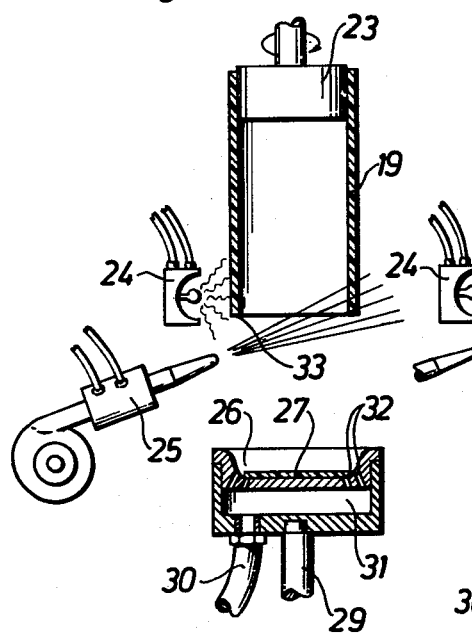

United States Patent [19]

Ohlsson

[11] 4,151,024
[45] Apr. 24, 1979

[54] METHOD FOR THE MANUFACTURE OF PACKING CONTAINERS

[75] Inventor: Ingemar W. Ohlsson, Malmo, Sweden

[73] Assignee: Tetra Pak Development, Lausanne, Switzerland

[21] Appl. No.: 777,942

[22] Filed: Mar. 16, 1977

[30] Foreign Application Priority Data

Mar. 31, 1976 [CH] Switzerland .................... 4020/76

[51] Int. Cl.² .......................................... B29C 24/20
[52] U.S. Cl. ...................................... 156/69; 156/84; 156/218; 264/25; 264/230; 264/248; 264/321; 264/342; 264/571; 264/DIG. 71
[58] Field of Search ............... 264/230, 342, DIG. 71, 264/25, 248, 321; 156/84, 218, 69

[56] References Cited

U.S. PATENT DOCUMENTS

| | | | |
|---|---|---|---|
| 2,138,568 | 11/1938 | Brandenberger | 156/84 X |
| 3,414,181 | 12/1968 | Sloan | 264/230 X |
| 3,416,991 | 12/1968 | Yoshimura | 156/84 X |
| 3,511,435 | 5/1970 | Hewitt | 156/218 X |
| 3,620,896 | 11/1971 | Glasgow | 264/342 R |
| 3,673,033 | 6/1972 | MacDaniel | 264/248 X |
| 3,899,807 | 8/1975 | Sovish | 264/230 X |
| 3,967,991 | 7/1976 | Shimano | 264/230 X |
| 3,969,173 | 7/1976 | Amberg | 264/319 X |
| 3,970,492 | 7/1976 | Amberg | 264/342 R X |
| 4,054,474 | 10/1977 | Collins | 264/230 X |

*Primary Examiner*—Thomas P. Pavelko
*Attorney, Agent, or Firm*—Burns, Doane, Swecker & Mathis

[57] ABSTRACT

A method is disclosed for fabricating packing containers comprised of a heat-shrinkable material. A web or blank of the material is heated on one side to an extent such that the material acquires a tendency to assume a tubular shape. Overlapping longitudinal ends of the web or blanks are heat and pressure sealed to form a tubular member. The ends of the tubular member are folded inwardly under the effect of heat to form flange-like portions to which end plates may be attached to form the packing container.

18 Claims, 9 Drawing Figures

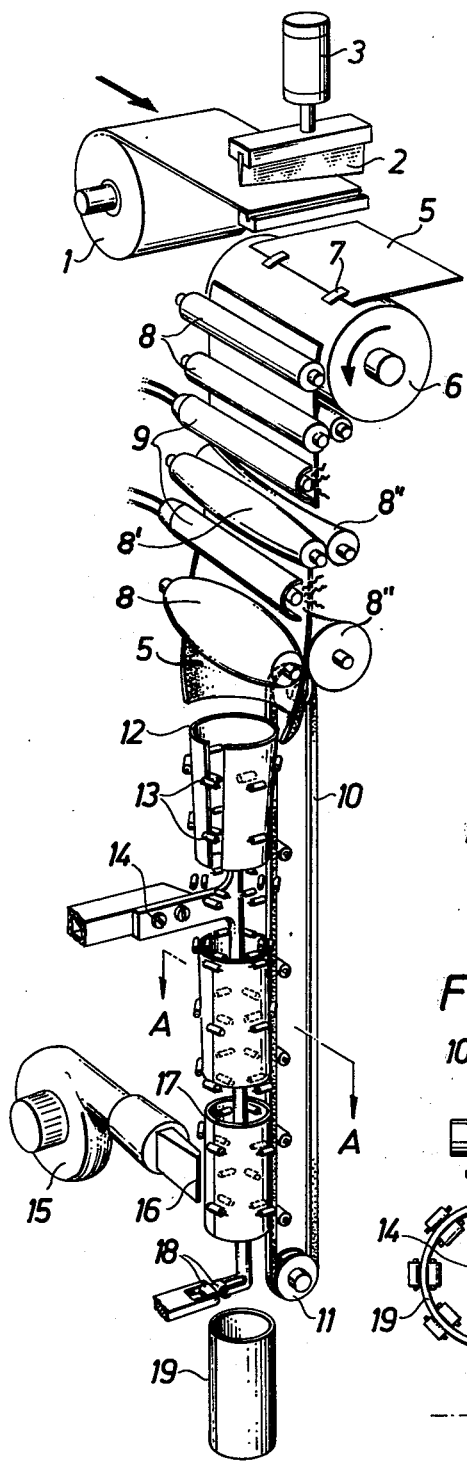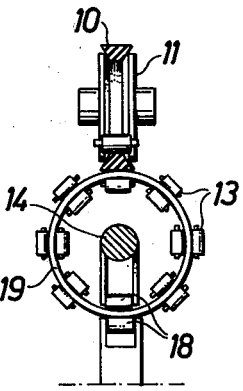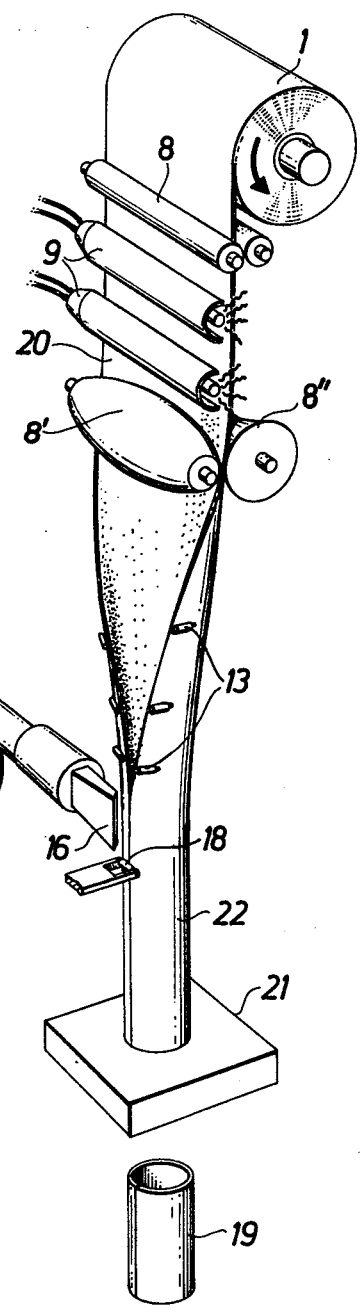

METHOD FOR THE MANUFACTURE OF PACKING CONTAINERS

The present invention relates to a method for the manufacture of packing containers from a heat-shrinkable material and an arrangement for the carrying out of the method.

In packaging technique it is endeavoured to produce package designs which are cheap and which can readily be massproduced in a rational manner and moreover meet the requirements of product protection, tightness and easy handling. Up to now one-way containers for liquids have often been manufactured from plastic-covered paper or cardboard, a material which in many respects has excellent properties but which will absorb liquid in places which are unprotected by a plastic layer, e.g. on free cut edges which come into contact with the liquid contents. In recent times, therefore, foamed plastic material has come into use which has good thermal insulation properties and which is very light. Moreover, if such a foamed plastic material is provided on one or on both sides with homogeneous plastic layers, the rigidity becomes very good. This packing material is furthermore characterized in that it can be deformed by shrinkage if the material has been prepared in a suitable manner. The foamed plastic material in principle consists of a large number of closed cells joined to one another, which cells have extremely thin walls. If the material is subjected to a stretching in connection with the extrusion, the originally spherical cells are extended so that they obtain an oblong or lenticular shape, which shape the cells retain when the plastic material is stabilized after cooling. The cell walls have been given an orientation during the stretching of the material which means that the material when heated up again wil shrink, since the cell walls will draw together and the cells will endeavour to re-assume their original spherical shape. The outer homogeneous plastic layers can also be given a similar orientation stretching in connection with the manufacture of the laminate, so that the homogeneous plastic layers too will have a tendency to shrink in the direction of orientation when they are warmed up later.

The characteristic of the material to be heat-shrinkable can be made use of during the forming process of the material, since it has been found that the material when heated along its one side will be deformed to produce a desired shape, since the side which is subjected to the effect of heat will contract while the non-heated side will not shrink to any appreciable degree.

Such a forming process by shrinkage of the foamed plastic material has in itself been known previously, but it was then a forming process of already made-up container bodies or parts of container bodies. It has now been found, however, that this forming process with the help of shrinkage can be extended also to use with a web of packing material and plane packing material blanks which form the subject of the present invention which is characterized in that a web or a blank of the shrinkable material is heated along the whole of one of its sides or along parts of the same, the web or blank being given thereby the form of a cylindrical tube whose edge regions are durably joined to one another.

Figure 4B:
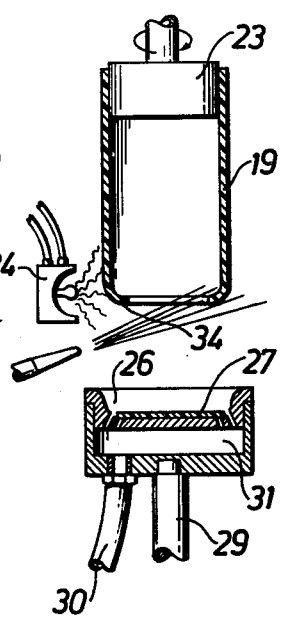
Figure 4C:
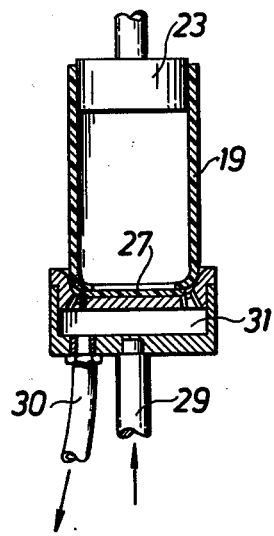
Figure 5A:
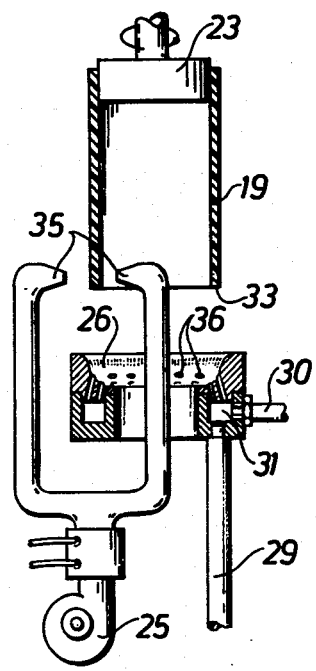
Figure 5B:
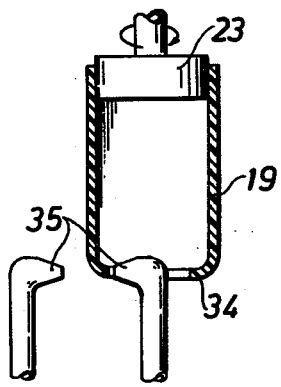
Figure 5C:
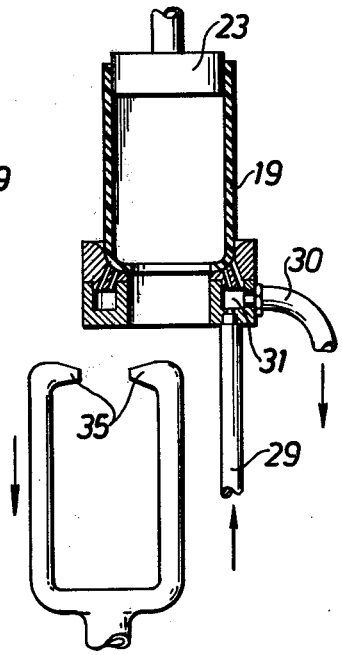

The invention will be described in the following with reference to the enclosed schematic drawing, wherein FIG. 1 shows a perspective sketch of an arrangement for the manufacture of circular-cylindrical parts of packing containers, FIG. 2 shows a cross-section A-A through this arrangement, FIG. 3 shows an arrangement for the manufacture of circular-cylindrical parts of packing containers from a web of packing material, FIG. 4 shows an arrangement for shrinkage forming and fitting on the end plates on circular-cylindrical packing containers, and FIG. 5 shows a variant of the arrangement shown in FIG. 4.

In FIG. 1 a magazine roll of web-shaped packing material is designated 1 and a knife element, by means of which the packing material web can be cut up to packing blanks, is referred to by numeral 2. The knife device 2 is intended to co-operate with a holding-up tool 4 and is actuated by a pneumatic cylinder 3. The cut-off packing blanks are designated 5 and a rotating driving cylinder is designated 6. The driving cylinder has clamping means 7 with the help of which the cut-off blanks 5 can be fixed on the cylinder 6. The arrangement comprises further a number of feeding rollers 8, between which the cut-off blanks 5 are guided, and the heat radiation elements, which are arranged to radiate heat onto the packing blanks, are designated 9. Rollers 8' and 8" are also provided so that the heated blanks will shrink and start to assume a cylindrical shape in cooperation with the convex and concave surfaces of the rollers, respectively. Rollers 8' have a generally cylindrical surface which is convex from end to end, while rollers 8" have a generally cylindrical surface which is concave from end to end. The convex and concave rollers are positioned so as to cooperate with each other as the heated blanks roll between them. The blanks, partly formed to a cylinder, are designated 12, whilst supporting rollers to facilitate the forming process are designated 13 and the conveyor belt is designated by numeral 10. The said conveyor belt 10 is driven with the help of a driving pulley 11. A bracket arrangement carrying the inner supporting rollers 13 and inner pressure rollers 18 is designated 14 and an arrangement for the supply of hot air for the sealing of the overlapping edge portions 17 of the cylindrical parts formed is designated 15. The arrangement 15 which in the following will be referred to as the longitudinal joint element comprises a nozzle part 16 by means of which a hot air stream is directed towards the overlap region 17.

The arrangement functions as follows:

The packing material, which preferably consists of polystyrene foam covered on one or on both sides with a homogeneous thin plastic material, e.g. polystyrene, polyethylene or the like, is rolled off the magazine roll 1 in the direction of the arrow shown and is conveyed in axial direction towards a driving roller 6 whereupon, when a specified length of packing material has been supplied, a piece of the web supplied is cut off with the help of the knife elements 2 which is actuated with the help of the pneumatic cylinder 3. In the present case it is assumed that the packing material web which is rolled off the magazine roll 1 has its main direction of orientation in the length direction of the web, which means that the cut-off packing blanks will be fed through the arrangement in a direction which is perpendicular to the preferred direction of orientation.

The cut-off packing blank 5 is collected with the help of clamping means 7 applied on the driving cylinder, and is introduced by the driving cylinder 6 between the feeding rollers 8, one or more of which are driven by means of arrangements not shown on the drawing. By means of electrically heated radiation heaters 9 one side of the packing blanks 5 is heated when they pass the radiation heaters 9 which causes the heated side to shrink in the preferred direction of orientation and the plane packing material blank to acquire a tendency to assume cylindrical shape. This spontaneous formation to a cylinder which is called shrinkage deformation, is controlled with the help of rollers 8' and 8". Rollers 8' have a generally cylindrical surface which is convex from end to end, and are located such that the heated blanks will shrink and assume a generally cylindrical shape in cooperation with the convex surface of rollers 8'. Concave rollers 8" are also provided and bear against the opposite face of the advancing blanks and hold the blanks against the surface of convex rollers 8'. The concave and convex rollers thus are of corresponding curvature which insures cooperation between the two surfaces as the heated blanks move between them. As the blanks are subjected to additional heating, they will acquire a greater tendency to assume a cylindrical shape, and the concave and convex rollers will advantageously be of greater curvature. As the blanks pass from a plane form to a cylindrical form they can no longer be conveyed with the help of rollers 8' and 8", but the conveying is taken over instead by the endless belt 10 which passes over and is driven by the pulley 11. The spontaneous formation to a cylinder is further controlled with the help of inner and outer supporting rollers 13, with the help of which the shrunk packing material blanks can be accurately gauged as to their form and dimension.

The said inner supporting rollers 13 are arranged on a bar which is carried by a bracket 14, which bar in principle runs co-axially inside the cylindrical parts formed. When the packing blanks 5 have been given the desired diameter, the overlapping portions 17, or at least their sides facing one another, are warmed up with the help of hot air which by means of the longitudinal joint element 15 is blown out of the nozzle 16. The said sides of the overlapping portions 17, facing one another and heated to sealing temperature, are pressed together with the help of pressure rollers 18, the inner rollers being arranged on the said bracket 14, so that the overlapping portions are joined together in a tight and durable joint to form a cylindrical tubular member or container part 19.

The cross-section A—A shown in FIG. 2 and the arrangement shown in FIG. 1 illustrate the placing of the inner and outer supporting rollers 13 and the conveyor belt 10. Also shown are the pressure rollers 18 for the pressing together of the overlapping portions 17 of the packing blank. The inner supporting bracket with its central bar 14 is shown and it is understood that the inner supporting rollers 13 must be supported on arms which are joined to the said bar 14, whilst the outer supporting rollers may be supported in any appropriate manner in the frame of the arrangement.

The arrangement shown in FIG. 3 comprises a magazine roll 1 from which a plane web of packing material 20 is rolled off. In this case it is assumed that the packing material, as in the earlier case, consists of orientated foamed plastic material but that the material is orientated biaxially or at least has a strong orientation across the direction of feeding of the web. As in the case described earlier, the web is fed with the help of feeding rollers 8, and one side of the web is heated with the help of radiation elements 9 in such a manner, that the inside of the web is caused to shrink. As in the aforementioned case, the forming of the web to a cylindrical tube occurs in cooperation with convex and concave rollers 8' and 8" respectively. In addition, outer and inner supporting rollers 13, which are only indicated in outline, are used to accurately gauge the form and dimension of the cylindrical tube to be formed. By the shrinkage of the web and the guidance of rollers 8', 8" and 13, the plane web is caused to form a circular-cylindrical tube, the longitudinal edges of the web overlapping each other and being heated in the overlap area with the help of the longitudinal joint element 15, in that hot air is blown out through the nozzle of the latter against the area of the overlap. In the manner which has been described earlier the overlap area heated to sealing temperature is pressed together with the help of pressure rollers 18 to form a tube 22 with circular-cylindrical cross-section in the present instance. With the help of a cutting device 21, not described in detail, the tube is then divided into cylindrical tubular member bodies 19, which in a manner to be described later are processed further to finished packing containers.

It has only been shown here how tubular member bodies with circular-cylindrical cross-section are manufactured, but it has been found that cylindrical tubular member bodies with square or rectangular cross-section, but with rounded corner parts, can equally successfully be made. If cylindrical tubular member bodies 19 with rectangular or square cross-section are wanted, the heat radiation elements 9 are arranged in such a manner that they heat only narrow regions in the direction of feeding of the packing material blanks or the packing material web, the material shrinking within the said regions whilst intermediate regions are not subjected to any shrinkage deformation. Thus, if four parallel radiation elements are located at a mutually equal distance from one another and they are arranged so that only narrow regions of the blanks or of the web respectively are subjected to the effect of heat, the result will be a cylinder with square cross-section but with rounded corner parts.

Beside heating with the help of heat radiation elements it is possible to use hot air, although it has been found that heating with the help of radiation elements will be more even and effective.

The manufacture of the cylindrical tubular member 19 constitutes of course only a partial processing of the packing material, and the said container bodies 19 must be further processed in order to obtain the final packing container. This end processing takes place with the help of arrangements shown schematically in FIGS. 4 and 5, which indicate the arrangements for the shrinking in of end flanges on the tubular member bodies 19 formed, and the application of end plates to the said shrunk-in flanges.

FIG. 4 shows an arrangement comprising a rotating holder 23 by means of which the cylindrical tubular member body 19 manufactured in the manner described earlier can be held and rotated around its axis of symmetry. The arrangement comprises further devices 24 and 25 for the heating of the free edge region 33 of the cylindrical portion 19. The arrangement comprises further a forming device 26 which is maneuverable by means of a bar 29 and with the help of this bar can be moved in relation to the cylindrical part 19. The forming device 26 comprises an inner forming surface, the size and form of which corresponds to the desired appearance of the flanges formed on the container body 19, and the forming device communicates along a hole 32 with a space 31 which is connected to a source of vacuum via a duct 30. The forming of the flange occurs in such a manner that the bottom edge region 33 of the cylindrical part 19 is heated with the help of the heating arrangements 24 and 25, the said flange area 33 being made in the manner described earlier, to shrink and to fold inwards so as to form a flange portion 34. However, it is difficult to determine the appearance of this flange portion if reliance is placed solely upon the shrinkage deformation itself, and the forming process can be facilitated in that, in the manner shown in FIG. 4b and 4c, the forming device 26 is brought into contact with the shrunk-in flange portion 34, the latter being subjected to suction by means of vacuum towards the inner forming surface of the forming device, so that the flange 34 formed is caused to cool and be stabilized in formed condition, which means that the flange is given a plane bottom flange surface which is suitable to constitute the sealing base for an end plate which is applied to the flange by means of heat-sealing or some heat-activated adhesive, e.g. hot melt.

The application of the end plate may also take place at the same time as the flange formation, as shown in FIG. 4, where an end plate 27 is introduced into the forming device 26 before the forming device is brought into contact with the shrunk-in flange portion 34. In order to obtain the intended suction effect on the flange portion 34 so as to bring the same into intimate contact with the end plate 27, it is proposed in accordance with the invention that the end plate 27 should be provided with a number of small holes or slits along its periphery but within the area which will be covered by the flange 34. If the end plate 27 is provided with such holes or slits, the shrunk-in flange 34 can be subjected to suction in the abovementioned manner to the forming device and be brought into intimate pressure contact with the inserted end plate 27, so that simultaneous flange formation and end plate sealing can be obtained.

In order to achieve a good seal, the end plate 27 can be provided in advance with an adhesive coating of e.g. hot melt, or else with a thermoplastic coating which can be heated with the help of one of the heating devices 24 and 25 which can direct a jet of hot air towards the end plate 27. The end plate 27 can preferably be made of the same material as the tubular member body 19, but it is also possible to make the end plate 27 of some other material, e.g. cardboard or homogeneous plastics. When the forming device in the manner shown in FIG. 4c has been pressed against the shrunk-in end of the cylindrical tubular member body 19, the flange 34 formed at the same time as the end plate 27 is durably joined to the flange to form an impervious and lasting end plate.

In FIG. 4 only the application of one end plate has been illustrated, but it will be readily appreciated that the other end plate, if required on the cylindrical body, can be fitted in the same manner although of course the holding device 23 has to be constructed somewhat differently. It is also possible to apply simultaneously two end plates 27 to opposite sides of the cylindrical tubular member body 19, but in such a case the holding devide 23 has to be located facing the tubular member body 19 and both opening edge regions of the cylindrical tubular member body be accessible for heating and form processing in the manner described above.

It has been found that the combined operation of flange shrinkage, flange formation and application of end plate is very rational and that these phases of the work can advantageously be co-ordinated in one operation.

However, if it is not intended to fix the end plate 27 at the same time as the flange 34 is shrunk in, an arrangement in accordance with FIG. 5 may be used where the holding device 23 is the same as that shown in FIG. 4. The arrangement for the heating of the end opening portion 33 of the cylindrical tubular member body 19 is designed somewhat differently, however, and consists of a hot air arrangement 25 which has two nozzles 35 which are directed towards either side of the edge portion 33 of the container body 19. The forming device 26 is arranged around one of the said nozzles 35 and can with the help of the maneuvering bar 29 be brought into contact with the shrunk-in flange portion 34, which is formed in the manner described above in that the flange 34, moulded, but still soft, is subjected to suction so that it is in accurate contact against the forming surface of the forming device 26 with the help of a vacuum produced by means of holes 36 which communicate with a space 31 in the forming device 26, which space is connected to a vacuum source, not shown here, via a duct 30.

As in the method described earlier, it is also possible, if so desired, to shrink both edge regions of the cylindrical body in at the same time if the holding device 23 is designed differently, and it is also possible to realize the flange formation in such a manner that the flanges will be dissimilar. It may be desirable e.g. in certain cases to have a bottom flange which is covered by a plane end plate to form the base of the container, whilst the other side of the cylindrical container body 19 is shrunk in e.g. to form a bottleneck or the like.

It has been found that with the arrangement and the method in accordance with the invention it is possible rationally to manufacture packing containers at low cost while at the same time there is considerable freedom of choice with regard to the outer shape of the packing container. It is possible, e.g. to manufacture straight cylindrical packing containers with rectangular or square cross-section but with rounded corners. It is also possible to manufacture purely circular-cylindrical packing containers, and even elliptical ones, if so desired. The most important factor, however, is that by the shrinking in of the flange at the packing container base it is possible to obtain great tightness at the base and high strength in the seal between the base plate of the package and the package body of which the shrunk-in flange constitutes an integral part. In the case where the packing container consists of a straight cylindrical container body with end plates, one of the end plates applied may advantageously be provided with a prepared emptying and filling hole through which the intended contents are introduced into the packing container, whereupon the filling hole is covered with a tear-off strip which is torn off when the package is to be opened and the contents made accessible.

As mentioned earlier, the shrunk-in top flange may optionally be designed in such a manner that the package largely resembles a glass bottle, e.g. a wine bottle of the traditional type, and in this case too the shape of the shrunk-in portion can be guided with the help of a forming device which subjects the softened shrunk-in plastic portion to suction towards the inner forming surface of the forming device, whereupon the plastic material will become stabilized in the sucked-in position, as a result of which great accuracy of formation is achieved. It is thus a great advantage of the method in accordance with the invention that considerably more freedom exists for choosing the shape of the package than with the previously known methods, and it is a further advantage that the shunk-in portions, e.g. the flanges and the neck portion of the bottle-shaped container, will be thicker and consequently more rigid than the rest of the cylindrical body.

I claim:

1. A method for the manufacture of a tubular member from a heat-shrinkable material, said method comprising the steps of:

conveying a heat-shrinkable material past at least one heat source with at least a portion of a surface of the material which is intended to form an inner surface of the tubular member being adjacent said heat source;

heating at least one portion of said surface adjacent to said heat source sufficiently such that the material shrinks and acquires a tendency to assume a generally tubular shape;

assisting the material to assume the tubular shape with edges of the material overlapping one another;

heating the overlapping longitudinal edges sufficiently such that the material along the edges reaches sealing temperatures; and, pressing the longitudinal edges together to form a tubular member having a tight and durable joint.

2. A method in accordance with claim 1 wherein the heat-shrinkable material is conveyed past the at least one heat source as a series of individual blanks.

3. A method in accordance with claim 1 wherein the heat-shrinkable material is conveyed past the at least one heat source as a continuous web, and further comprising the step of:

cutting the continuous web into tubular members of a predetermined size subsequently to pressing the longitudinal edges together.

4. A method in accordance with claim 1 wherein the tubular members are cylindrical in cross-section.

5. A method in accordance with claim 1 wherein the tubular members are rectangular in cross-section.

6. A method in accordance with claim 1 wherein the material is assisted to assume the tubular shape by conveying the material along a plurality of supporting rollers which are positioned adjacent to at least one surface of the material.

7. A method in accordance with claim 1 wherein the overlapping longitudinal edges are pressed together by conveying the sufficiently heated edges between at least two pressure rollers.

8. A method in accordance with claim 1, wherein the heating of the at least one portion of the side of the material takes place with the help of heat convection from a heated body, at least in part, by means of radiation heat.

9. A method in accordance with claim 1 wherein the heating of the at least one portion of the side of the material takes place with the help of heat convection from a heated body at least in part by means of hot air.

10. A method in accordance with claim 1, wherein the shrinkable material consists of orientation-stretched foam plastic, and wherein the material is conveyed past said at least one heat source perpendicularly to the direction of orientation of the material.

11. A method in accordance with claim 1, wherein the tubular member is provided with at least one end plate tightly adhering to at least one end opening of the tubular member.

12. A method in accordance with claim 11, wherein the said end plate is sealed to the tubular member along at least one flange-like portion which is formed by folding in an end region of the tubular member.

13. A method in accordance with claim 12 wherein the at least one end plate is durably joined to the tubular member by a surface fusing of surface layers of the end plate and the flange-like portion.

14. A method in accordance with claim 12, wherein the inner surface of at least one end portion of the tubular member is heated to thereby obtain the at least one flange-like portion.

15. A method in accordance with claim 14, wherein the forming of the at least one flange-like portion at an end region of the tubular member takes place with the help of a forming device, the inner contour of which corresponds to a desired outer contour of the at least one flange-like portion, and further comprising the step of:

subjecting the flange-like portion to suction acting towards the forming device, so as to be in accurate contact with an inner surface of the forming device, whereupon the at least one flange-like portion is formed to a desired shape and is sufficiently cooled to stabilize the material.

16. A method in accordance with claim 15, wherein prior to the forming operation the forming device is provided with an end plate which is durably joined to the flange-like portion at the same time as the flange-like portion is moulded.

17. A method in accordance with claim 16, wherein the suction directed upon the flange-like portion provided by the forming device is effected through openings within the end plate.

18. A method in accordance with claim 12 further comprising the step of:

durably joining the end plates to the tubular member with a heat-activated adhesive.

* * * * *